US008628319B2

(12) United States Patent
Mazzarolo

(10) Patent No.: US 8,628,319 B2
(45) **Date of Patent: *Jan. 14, 2014**

(54) APPARATUS FOR MANUFACTURING THERMOFORMED PLASTIC ARTICLES

(75) Inventor: Ivonis Mazzarolo, Westmount (CA)

(73) Assignee: IVMA Holdings Company, Vaudreuil-Dorion, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/565,450

(22) Filed: Aug. 2, 2012

(65) Prior Publication Data

US 2012/0298032 A1 Nov. 29, 2012

Related U.S. Application Data

(63) Continuation-in-part of application No. 13/274,838, filed on Oct. 17, 2011, now Pat. No. 8,282,382, which is a continuation of application No. 12/756,244, filed on Apr. 8, 2010, now Pat. No. 8,038,432, which is a continuation of application No. 11/583,529, filed on Oct. 19, 2006, now abandoned, which is a continuation of application No. 10/691,231, filed on Oct. 23, 2003, now Pat. No. 7,175,800, which is a continuation-in-part of application No. 10/207,595, filed on Jul. 29, 2002, now Pat. No. 6,942,832.

(51) Int. Cl.
*B29C 51/10* (2006.01)

(52) U.S. Cl.
USPC ........ 425/388; 425/343; 425/387.1; 425/402; 425/504; 425/540; 101/212; 101/329; 101/348

(58) Field of Classification Search
USPC ........... 425/92, 503, 504, 112, 121, 122, 123, 425/342.1, 343, 387.1, 388, 402, 451, 425/DIG. 60; 101/35, 36, 37, 212, 232, 329, 101/348
See application file for complete search history.

(56) References Cited

U.S. PATENT DOCUMENTS

| | | | | |
|---|---|---|---|---|
| 1,695,098 A | | 12/1928 | Hiering | |
| 3,071,812 A | | 1/1963 | Miller | |
| 3,259,060 A | | 7/1966 | Martin | |
| 3,282,202 A | | 11/1966 | Groth et al. | |
| 3,479,694 A | | 11/1969 | Winstead | |
| 3,487,139 A | | 12/1969 | Mojonnier et al. | |
| 3,556,001 A | * | 1/1971 | Kinney et al. ................... | 101/92 |

(Continued)

FOREIGN PATENT DOCUMENTS

| | | |
|---|---|---|
| JP | 56075819 | 6/1981 |
| JP | 11-268076 | 10/1999 |

*Primary Examiner* — Seyed Masoud Malekzadeh
(74) *Attorney, Agent, or Firm* — William Giltinan; Carlton Fields, PA

(57) ABSTRACT

An apparatus for vacuum thermoforming and printing plastic articles from a continuous web of plastic material in which a rotatable vacuum thermoforming drum has a plurality of vacuum thermoforming dies mounted on circumferentially surfaces. The drum further comprises a gear path and a cam path, each with a plurality of substantially flat and curved sections. A print structure in a frame includes a device for imparting ink to the articles after they are formed, and a linear bearing adapted to allow the printing cylinder to move in a constrained motion substantially normal to the central axis. The printing cylinder comprises a shaft with a pinion gear to engage the gear path and a cam roller to engage the cam path. As the drum rotates, the articles are formed, printed and separated in substantially a single operation.

8 Claims, 10 Drawing Sheets

(56) References Cited

U.S. PATENT DOCUMENTS

| | | | | |
|---|---|---|---|---|
| 3,568,594 | A | | 3/1971 | Johnston et al. |
| 3,593,661 | A | | 7/1971 | Tripp |
| 3,632,252 | A | | 1/1972 | Amberg et al. |
| 3,668,980 | A | | 6/1972 | Tone |
| 3,735,697 | A | | 5/1973 | Provan |
| 3,771,938 | A | | 11/1973 | Pinto et al. |
| 3,779,786 | A | | 12/1973 | Tone |
| 3,789,095 | A | | 1/1974 | Winstead |
| 3,827,356 | A | | 8/1974 | Snow et al. |
| 3,915,087 | A | | 10/1975 | Tiemann |
| 3,964,237 | A | | 6/1976 | Johansen |
| 4,121,402 | A | | 10/1978 | Cress et al. |
| 4,210,481 | A | | 7/1980 | Wolff et al. |
| 4,235,579 | A | | 11/1980 | Kurz et al. |
| 4,271,757 | A | | 6/1981 | Maxwell et al. |
| 4,284,396 | A | | 8/1981 | Thissen et al. |
| 4,288,400 | A | | 9/1981 | Winstead |
| 4,289,817 | A | | 9/1981 | Valyi |
| 4,314,149 | A | * | 2/1982 | Gomez ........................... 235/96 |
| 4,384,836 | A | | 5/1983 | Winstead |
| 4,413,964 | A | | 11/1983 | Winstead |
| 4,421,712 | A | | 12/1983 | Winstead |
| 4,445,432 | A | | 5/1984 | Ford et al. |
| 4,518,096 | A | | 5/1985 | Winstead |
| 4,519,310 | A | | 5/1985 | Shimizu et al. |
| 4,563,949 | A | | 1/1986 | Rogge |
| 4,627,537 | A | | 12/1986 | Rogers |
| 4,669,969 | A | | 6/1987 | Martelli et al. |
| 4,682,942 | A | | 7/1987 | Gotchel et al. |
| 4,741,266 | A | | 5/1988 | Stirbis et al. |
| 4,753,059 | A | | 6/1988 | Natterer |
| 4,764,241 | A | | 8/1988 | Makino |
| 4,830,596 | A | | 5/1989 | Neu |
| 4,864,927 | A | | 9/1989 | Niehaus |
| 4,874,456 | A | | 10/1989 | Takagi |
| 4,993,259 | A | | 2/1991 | LaFountain |
| 5,010,814 | A | | 4/1991 | Shishikura |
| 5,017,125 | A | | 5/1991 | Finnah |
| 5,193,456 | A | | 3/1993 | Wolfe et al. |
| 5,251,554 | A | * | 10/1993 | Eckert et al. .................... 101/91 |
| 5,366,685 | A | | 11/1994 | Fujii et al. |
| 5,366,791 | A | | 11/1994 | Carr et al. |
| 5,423,252 | A | | 6/1995 | Yamamoto et al. |
| 5,445,315 | A | | 8/1995 | Shelby |
| 5,451,157 | A | | 9/1995 | Gimenez |
| 5,492,465 | A | | 2/1996 | Matuzawa et al. |
| 5,685,220 | A | | 11/1997 | Steffen et al. |
| 5,701,815 | A | | 12/1997 | Bocko et al. |
| 5,759,624 | A | | 6/1998 | Neale et al. |
| 5,766,525 | A | | 6/1998 | Andersen et al. |
| 5,839,601 | A | | 11/1998 | Van Melle |
| D406,025 | S | | 2/1999 | Hung |
| 5,911,794 | A | | 6/1999 | Nordhoff |
| 6,098,830 | A | | 8/2000 | Jamieson |
| 6,142,769 | A | | 11/2000 | Walker |
| D437,538 | S | | 2/2001 | Corredor et al. |
| 6,212,721 | B1 | | 4/2001 | Borodulin et al. |
| 6,286,428 | B1 | | 9/2001 | Madsen |
| 6,314,876 | B1 | | 11/2001 | Ackley |
| 6,481,995 | B2 | | 11/2002 | Delrosario et al. |
| 6,668,721 | B2 | | 12/2003 | Naka |
| 6,708,735 | B1 | | 3/2004 | Kenihan |
| 6,823,794 | B2 | | 11/2004 | Bosler et al. |
| 6,823,795 | B2 | | 11/2004 | Willcocks et al. |
| 7,178,571 | B2 | | 2/2007 | Vergona |
| 7,311,045 | B2 | | 12/2007 | Ackley et al. |
| 2001/0027704 | A1 | | 10/2001 | Kee |
| 2001/0042455 | A1 | | 11/2001 | Ackley |
| 2003/0006536 | A1 | | 1/2003 | Dunlap et al. |
| 2008/0280742 | A1 | | 11/2008 | Cerasani |

* cited by examiner

APPARATUS FOR MANUFACTURING THERMOFORMED PLASTIC ARTICLES

RELATED APPLICATION

This application is a continuation-in-part of U.S. Ser. No. 13/274,838 filed on Oct. 17, 2011 and published as U.S. Publication 2012-0034329 on Feb. 9, 2012, which is a continuation of U.S. application Ser. No. 12/756,244 filed Apr. 8, 2010, now U.S. Pat. No. 8,038,432, which is a continuation of U.S. application Ser. No. 11/583,529, filed Oct. 19, 2006, now abandoned, which is a continuation of U.S. application Ser. No. 10/691,231, filed Oct. 23, 2003, now U.S. Pat. No. 7,175,800, which is a continuation-in-part of U.S. application Ser. No. 10/207,595, filed on Jul. 29, 2002, now U.S. Pat. No. 6,942,832 and claims priority thereto, and all of which are incorporated by reference herein.

FIELD OF THE INVENTION

This invention relates to the vacuum thermoformed plastic articles and particularly to vacuum thermoformed disposable drink cup lids having printed indicia thereon and a method of manufacturing such articles.

BACKGROUND

It is known to manufacture thin plastic articles such as disposable drink cup lids by vacuum thermoforming. Such articles are manufactured by causing a web of extruded plastic sheet material to contact a metal die having the desired shape of the article formed into a surface thereof. Vacuum is applied to the platen surface through small holes to draw the plastic material over the contours of the die. The articles are thereafter separated from the web by die cutting and stacked and/or boxed using conventional automation devices.

It is also known to vacuum form logos and other indicia on the articles. Where the articles are lids, such indicia are typically formed of raised surfaces in a central deck area of the lid. Because thermoformed plastic lids are usually of one color, it can be difficult to see such vacuum embossed indicia clearly. To add definition, therefore, it is sometimes desirable that the raised surfaces of the embossed indicia may be colored. Alternatively, printing without raised surfaces can be utilized. Such printing is traditionally carried out by printing machinery separate from the thermoforming machinery, in a secondary operation, thereby raising manufacturing costs and extending run times.

SUMMARY

According to the present invention, an apparatus is provided for manufacturing vacuum thermoformed articles (such as disposable drink cup lids) in which the apparatus is capable of thermoforming and printing (i.e. providing with coloring on embossed surfaces and/or printed with logos and other indicia on non-embossed surfaces), in what is essentially a single operation. In other words, printing takes place as the article is being thermoformed. The invention thus increases manufacturing efficiency, lowers manufacturing costs, and allows the manufacturer to provide added value by offering articles with incorporating marketing and promotional indicia. Certain embodiments of the invention also allow for printing in multiple colors, thereby allowing for the creation of more aesthetically pleasing indicia.

In general, the apparatus operates by receiving an extruded thin web of thermoformable plastic sheet material, contacting the web while hot with a vacuum thermoforming die configured to form articles having printable areas, applying vacuum to form the articles, thereafter applying ink to the printable areas while the articles remain in the web and, then separating the fully formed and printed articles from the web. As stated above, the term "printed" is used herein to refer to both adding color to embossed surfaces and placing indicia on essentially flat surfaces. The printing process is carried out via a print mechanism that is adapted to travel in a path that is essentially linear and perpendicular to the surface to be printed, thereby reducing the tendency for smudging during the printing process.

In the preferred embodiment hereinafter described, the apparatus comprises a rotating thermoforming drum carrying a series of plates with die inserts for forming articles, and a multi-surface rotatable printing cylinder which rotates in synchronism with the thermoforming drum. A printing structure comprising a printing cylinder rotates in synchronism with the drum and with an Anilox roller which carries ink from a supply to the plates on the printing cylinder. The printing structure comprises a print structure frame with a linear bearing adapted to allow the print cylinder to move in a constrained motion substantially normal to the central axis of the thermoforming drum. Synchronism is preferably maintained by gears to ensure registration between the ink plates and the thermoformed articles and a cam and cam path adapted to allow sufficient clearance between thermoforming drum and printing structure as the thermoforming drum rotates. Fully formed and printed articles pass from the thermoforming drum to a cutting device where they are separated from the web. The articles may be stacked and excess material from the web returned to the extruder supply hopper.

As illustrated in connection with the embodiments described herein, it is possible to print in more than one color on a surface of the article. This is accomplished by providing two or more printing mechanisms in angular spaced relationship to the thermoforming system, one comprising a printer element which engages a surface of the article at one point in the thermoforming process and another printing element which contacts the article for in-registry printing purposes at another angularly spaced position in the thermoforming process.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
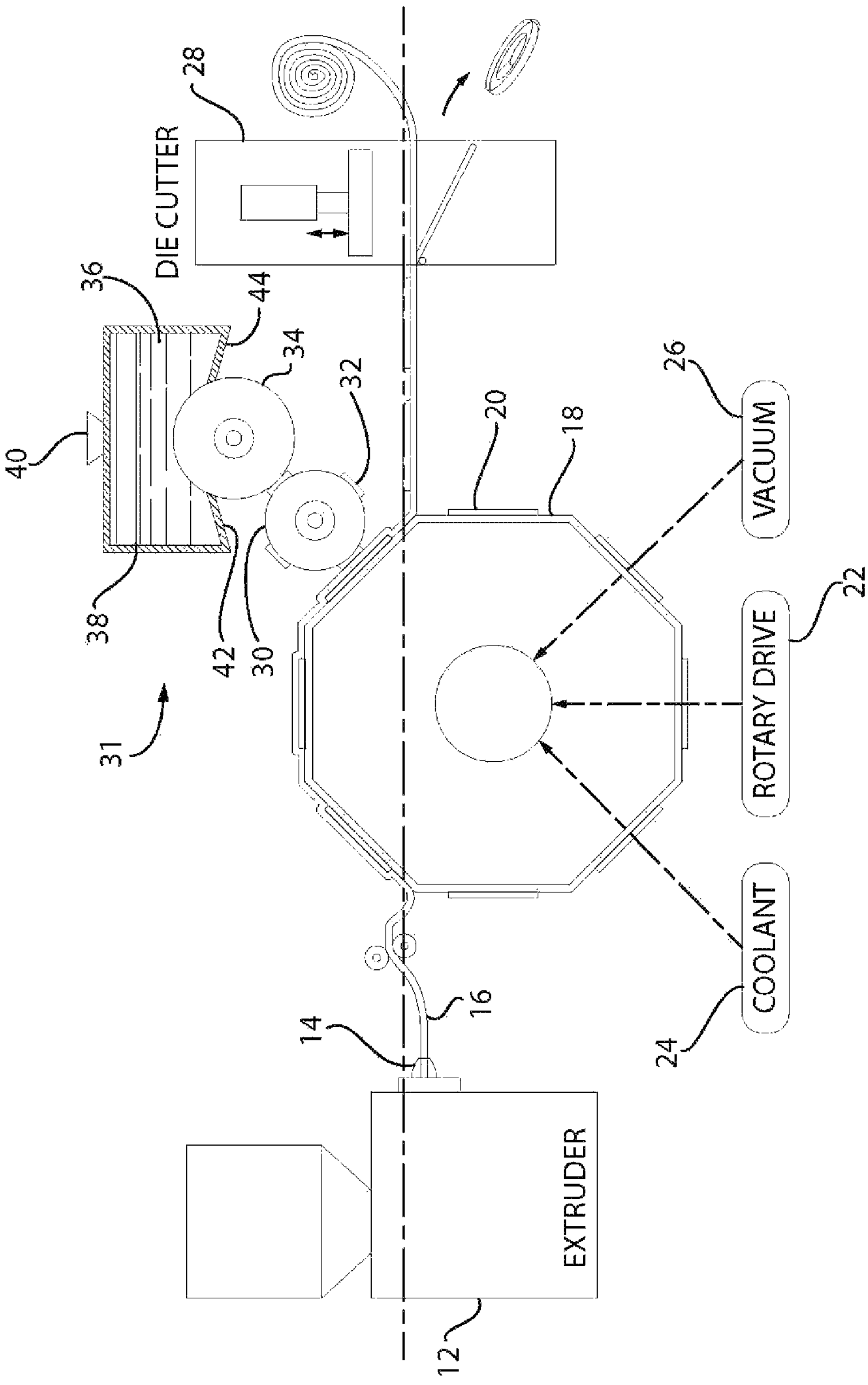
FIG. 1 is a schematic view of an embodiment of the apparatus according to the present invention adapted for thermoforming disposable drink cup lids and printing them with one color.

Referring to the drawings, FIG. 1 illustrates in schematic fashion an apparatus 10 for manufacturing vacuum thermoformed drink cup lids and simultaneously printing the lids in what is essentially a single and continuous manufacturing operation according to the present invention. The apparatus 10 comprises a hot melt extruder 12 for receiving ground or pelletized plastic material such as polystyrene or polyethylene. The extruder 12 is equipped to melt the plastic material and force it through an exit die 14 to produce a thin web 16 of plastic material. The width of the web 16 may be any desired width; here approximately 24 inches.

The web 16 exits the extruder die 14 at elevated temperature and passes to a vacuum forming drum 18 which is suitably mounted for rotation about a central axis by a drive 22 in either direction to cause the web to contact forming dies 20 mounted on die mounting surfaces (not illustrated) on the drum 18 for the desired time. Coolant and vacuum are applied to the drum by sources 24 and 26 respectively to control temperatures and to produce vacuum forming.

After the desired time of contact with the dies 20 on the drum 18, the web 16 with the articles formed therein passes to a die cutter and stacker 28 of conventional design.

Printing structure 31 carries out the printing operation in synchronism with the thermoforming operation. A printing cylinder 30 is mounted above the drum 18 by means to be described with reference to FIG. 7. The printing cylinder 30 is equipped with plates 32 which contact the vacuum formed articles.

The plates 32 on the printing cylinder 30 are continuously inked by an Anilox roller 34 which picks up ink 36 from an ink fountain 38 having a filler mechanism 40. Seals and proper ink distribution are provided by Nylon doctor blade 42 and 44 which form the bottom of the ink fountain 38 and engage the upper quadrant of the Anilox roller 34.

The drum 18, printing cylinder 30 and Anilox roller 34 all rotate in synchronism as a result of means hereinafter described in detail with reference to FIGS. 7-10. In addition the printing cylinder 30, Anilox roller 34 and ink fountain 38 are adapted for substantially linear movement by means to be described in order to accommodate the angular surface of the octagonal thermoforming drum 18.

Figure 2:
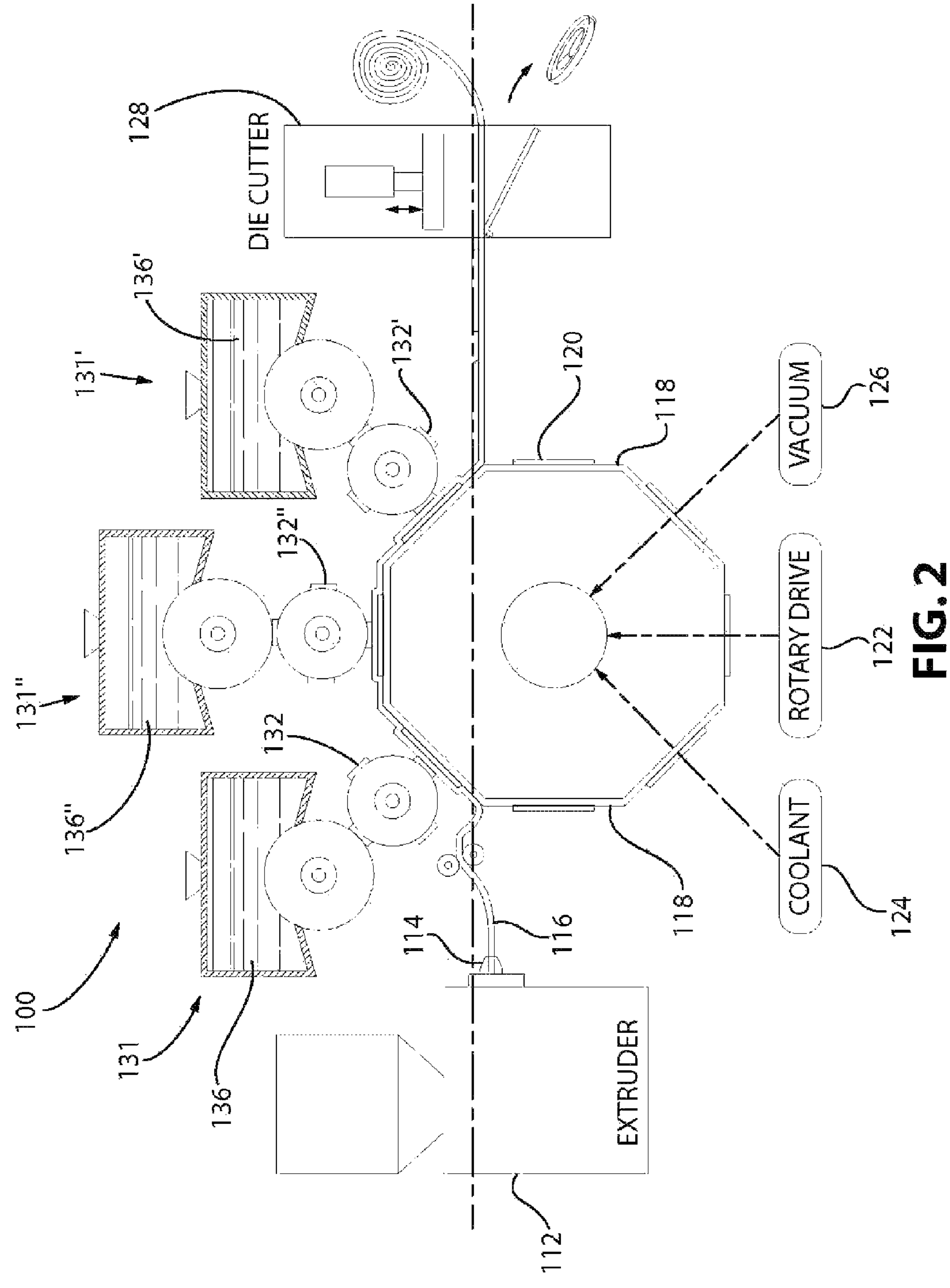
FIG. 2 is a schematic view of an embodiment of the apparatus according to the present invention adapted for thermoforming disposable drink cup lids and printing them with three colors.

Referring now to FIG. 2, also illustrated in schematic fashion, an apparatus 100 is shown for manufacturing vacuum thermoformed drink cup lids and simultaneously printing the lids in what is essentially a single and continuous manufacturing operation according to the present invention, and which is adapted for printing with three colors. The apparatus 100 largely operates in a manner consistent with that described above and comprises a hot melt extruder 112 equipped to melt the plastic material and force it through an exit die 114 to produce a thin web 116 of plastic material. The web 116 exits the extruder die 114 at an elevated temperature and passes to a vacuum forming drum 118 which is suitably mounted for rotation by a drive 122. Coolant and vacuum are applied to the drum by sources 124 and 126 respectively to control temperatures and to produce vacuum forming. After the desired time of contact with the dies 120 on the drum 118, the web 116 with the articles formed therein passes to a die cutter and stacker 128.

To carry out the printing operation in synchronism with the thermoforming operation, a print structures 131, 131', and 131" have components and operations analogous to print structure 31 previously described except that inks 136, 136', and 136" can be of different colors and plates 132, 132', 132" can be of appropriate patterns to allow for multi-color printing.

Figure 3:
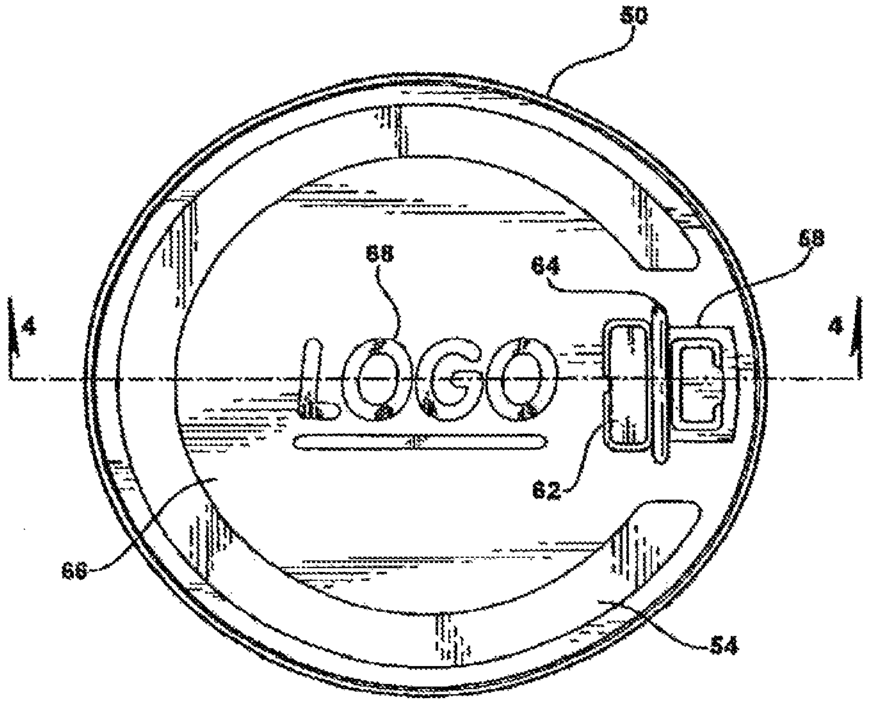
FIG. 3 is a plan view of a drink cup lid made by a preferred embodiment of the apparatus of the present invention.
Figure 4:
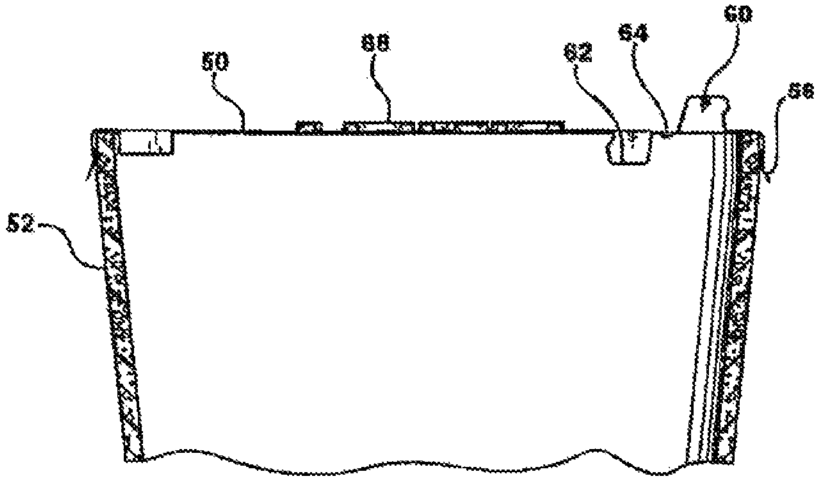
FIG. 4 is a sectional view of the FIG. 3 lid.

Referring now to FIGS. 3 and 4, a specific thermoformed article 50 is shown to comprise a thin plastic drink cup lid of approximately 3½ inches in diameter and configured to be applied to the upper rim of a standard plastic or paper disposable drink cup 52. The specific article 50 shown in FIGS. 3 and 4 is a hot drink cup lid producing what is known in the trade as a plug fit by means of an approximately 300° channel 54 which is vacuum thermoformed into the material of the lid 50. A skirt 56 is also vacuum formed around the periphery of the lid and finally formed by the die cutting operation carried out by devices 28 or 128 shown in FIGS. 1 and 2.

The lid 50 is shown to comprise a drink-through tear-back tab 58 defined by a partially die cut area near the periphery of the lid and within the discontinuity of the plug fit channel 54. A raised feature 60 is formed in the lid 50 adjacent a shallow hinge 64 such that the raised operating feature 60 may be folded back and locked back into a receiver cavity 62 formed immediately behind the hinge 64. The details of the tear-back/lock-back features of the lid 50 are more fully described in the co-pending application for U.S. patent Ser. No. 09/952,144 filed Sep. 14, 2001, the entire disclosure of which is incorporated herein by reference.

Figure 5:
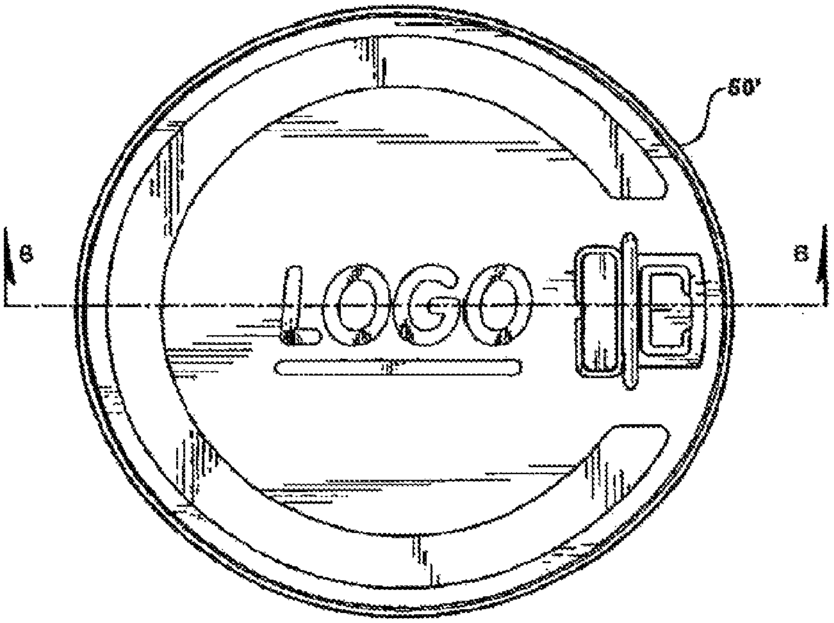
FIG. 5 is a plan view of a second lid made by a preferred embodiment of the apparatus of the present invention.
Figure 6:
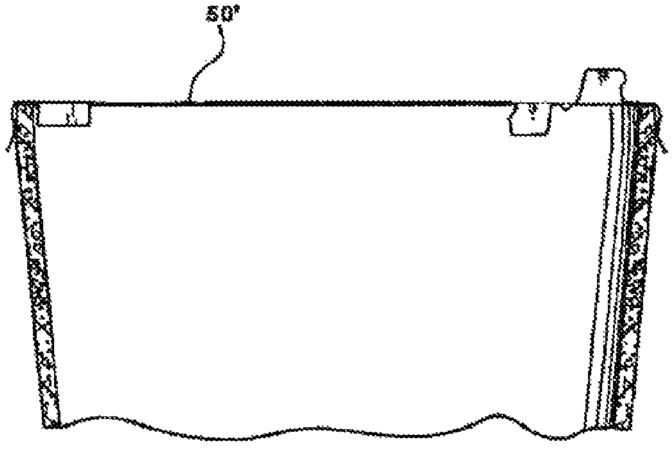
FIG. 6 is a sectional view of the FIG. 5 lid.

The lid 50 is shown to comprise a large flat central deck area 66 in which there is embossed, during the thermoforming operation, a raised logo 68 the features of which have relatively flat raised surfaces. In accordance with the invention coloring is imparted to the raised surfaces of the logo 68 by the printing cylinder 30 and the apparatus of FIG. 1. FIGS. 5 and 6 illustrate a second lid 50' of a configuration which is slightly different from the configuration of lid 50. Specifically, the lid 50' has no embossed logo. Accordingly, plates (not separately illustrated) formed, like conventional rubber stamps to carry the desired lettering or other indicia can be used on cylinder 30.

Where multi-color printing is used, different patterns of different colors can be printed at different locations on lid 50, 50' (for example and without limitation printing different portions of an embossed logo in different colors), or colors can be overlapped to mix colors.

Figure 7:
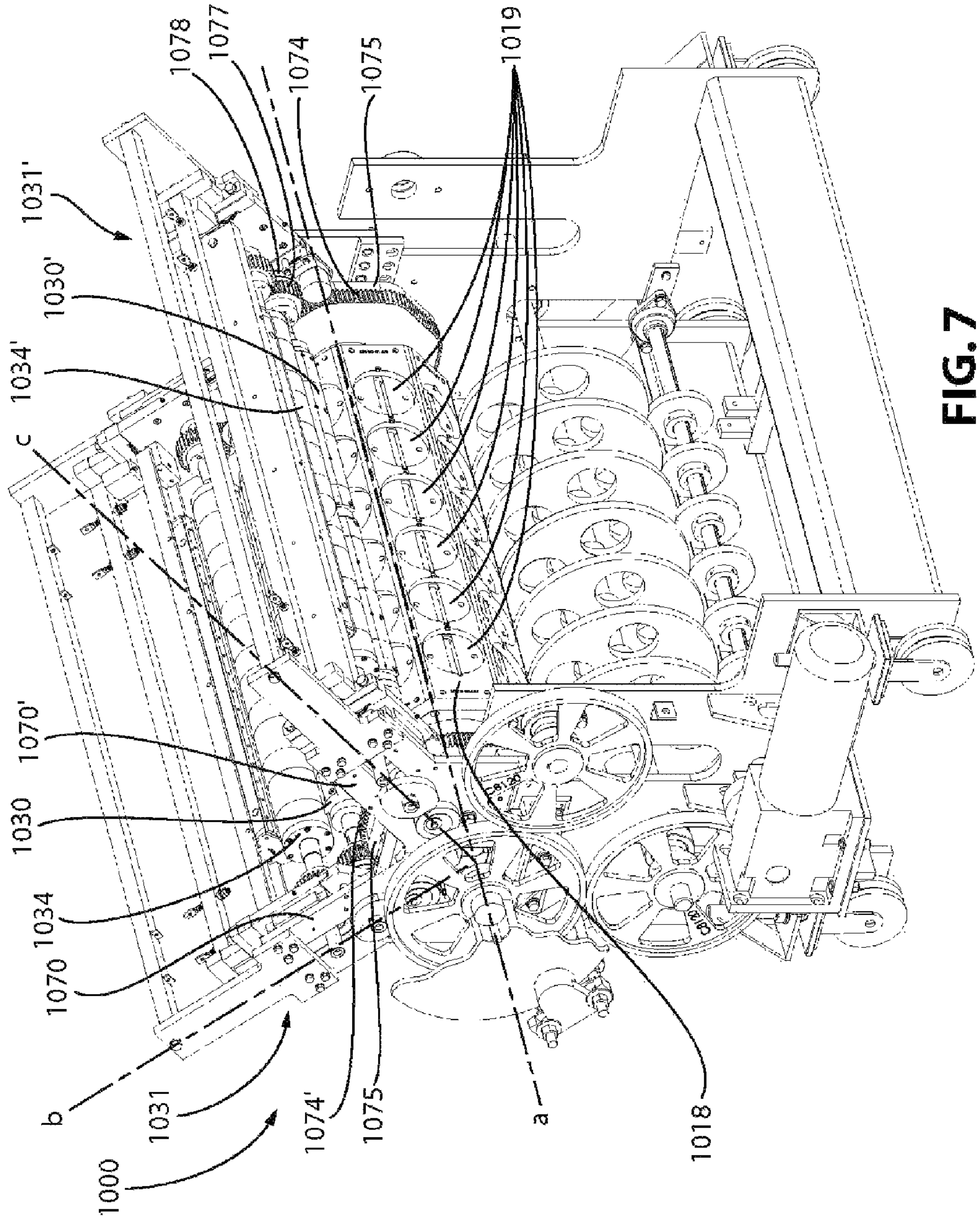
FIG. 7 is a perspective view of an embodiment of the apparatus according to the present invention adapted for thermoforming disposable drink cup lids and printing them with two colors.
Figure 8:
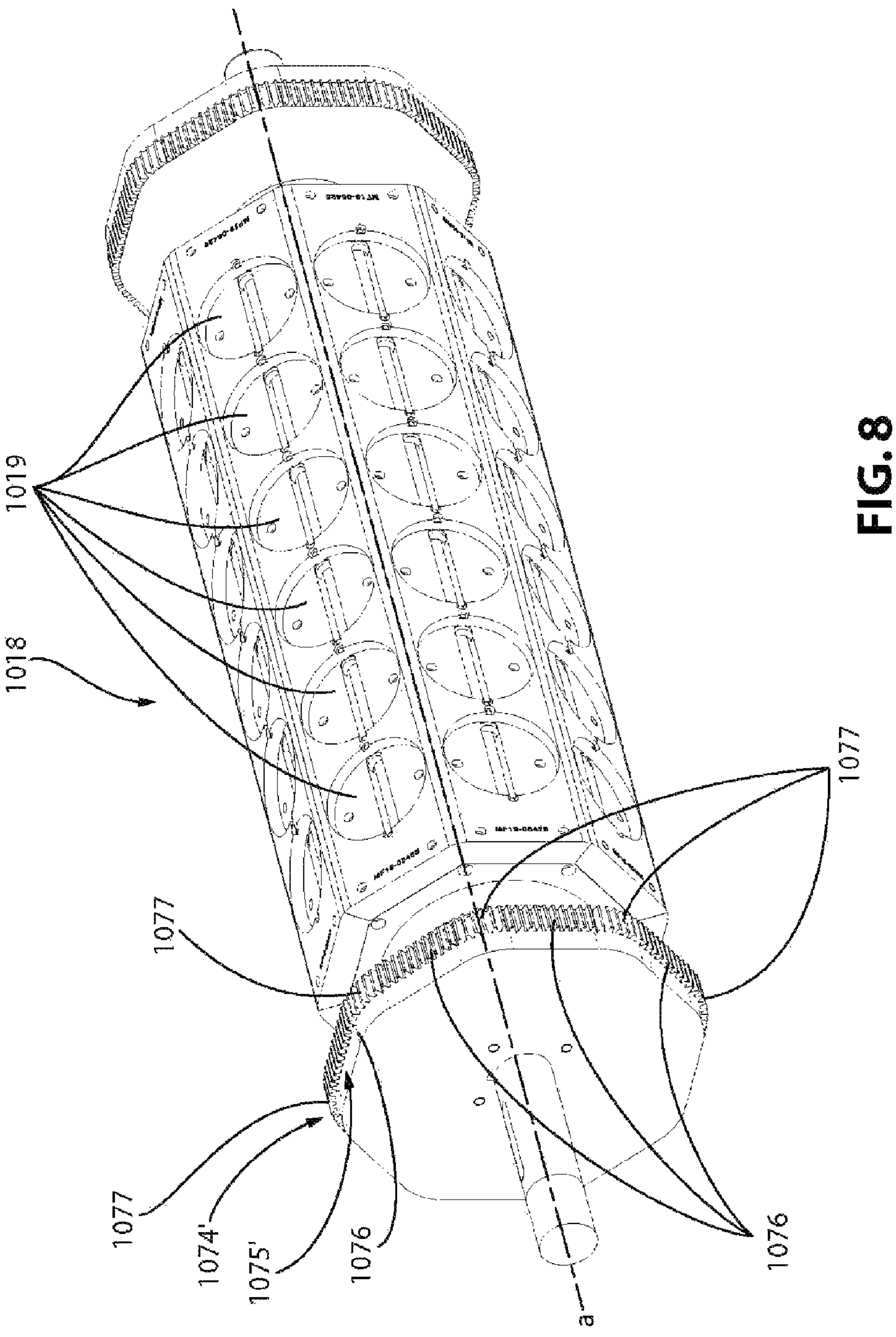
FIG. 8 is a perspective view of the vacuum thermoforming drum and gear path of the embodiment illustrated in FIG. 7, with thermoforming dies removed.
Figure 10:
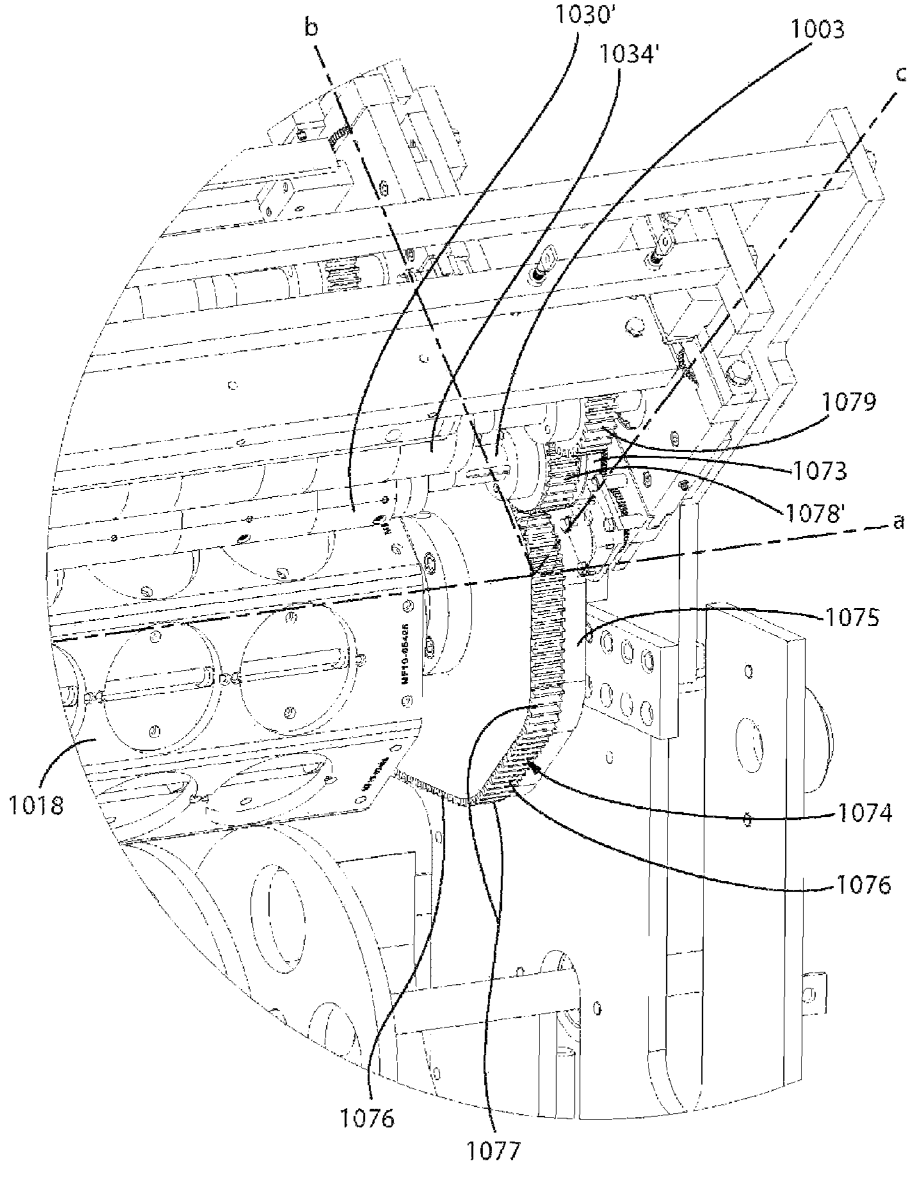
FIG. 10 is a perspective view of a portion of the embodiment illustrated in FIG. 7 showing the gear path and cam path utilized to synchronize the printing process with the rotation of the thermoforming drum.

Referring now to FIGS. 7 and 10, an embodiment 1000 of the apparatus of the present invention capable of printing in two colors is illustrated. Octagonal thermoforming drum 1018, printing cylinders 1030,1030', and Anilox rollers 1034, 1034' are shown in greater detail. A continuous gear path 1074 is formed around the peripheral end of the drum 1018 with teeth extending parallel to the axis of rotation of the drum 1018. The gear path 1074 is in constant contact with a print cylinder pinion gear 1078' which is mechanically attached to the printing cylinder 1030' mounted on printing cylinder shaft 1003 to rotate the printing cylinder 1030' in synchronism with the rotation of the drum 1018 thereby to ensure proper registry with dies (not illustrated) carried on the flat die mounting surfaces 1019 of the drum 1018. In this instance there are positions for six lid forming dies (not illustrated) across each flat surface of drum 1018, but this number is merely illustrative. It is desirable that all forming dies be male dies and have essentially the same height so as to be properly engaged by the printing surfaces. The feature 60 shown in FIGS. 3 and 4 of the drawings requires that the dies (not illustrated) be sized and located to clear the feature 60 as they engage the top surfaces of the logo 68 during the printing operation.

Figure 11:
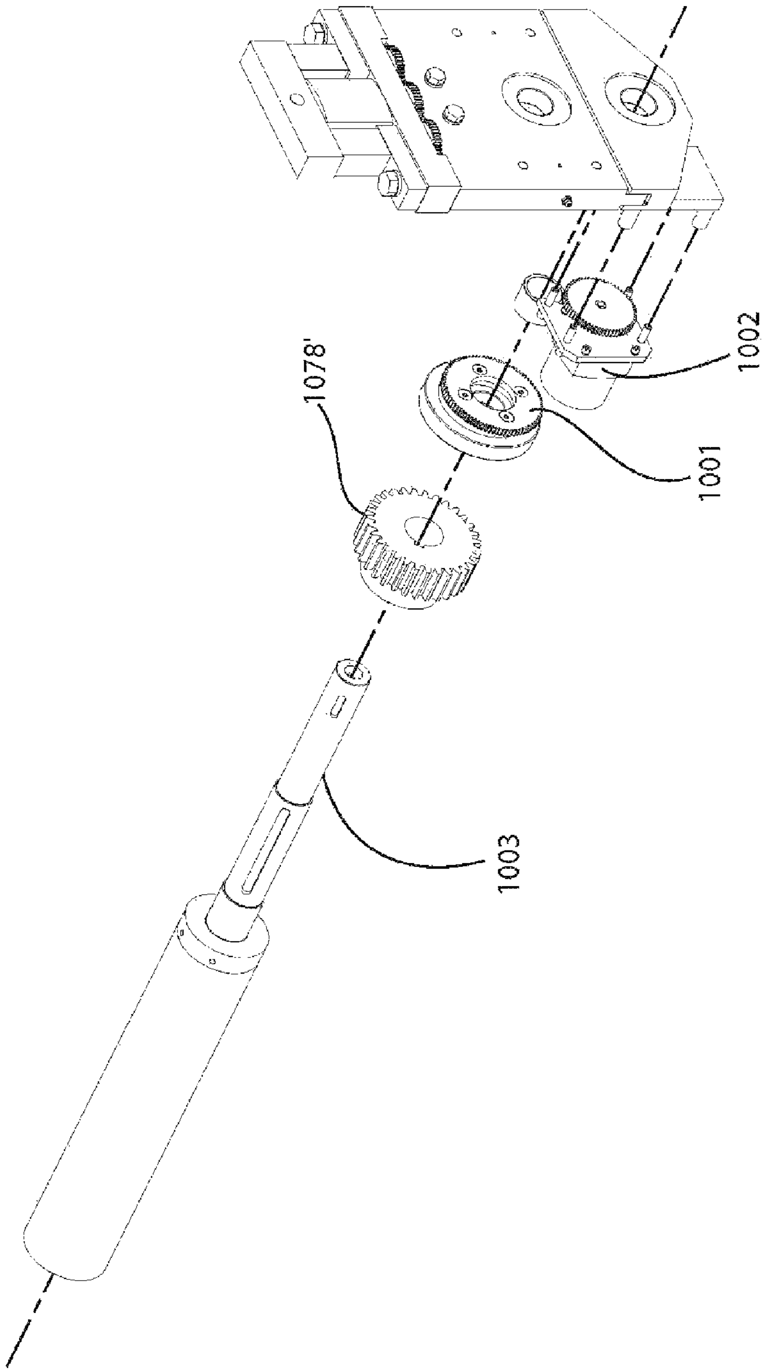
FIG. 11 is an exploded, perspective view of the motorized offset mechanism utilized to adjust the distance between the print head and the dies on the thermoforming drum.

Pinion gear 1078' is adapted to engage gear path 1074. Cam roller 1073 is adapted to contact cam paths 1075 on drum 1018. The gear path 1074 is continuous, and comprises a plurality of substantially flat geared sections 1076 and a plurality of curved gear sections 1077 therebetween. Similarly, substantially the same arrangement is maintained on cam path 1075, which also comprises a corresponding plurality of substantially cam path sections and a plurality of substantially curved cam path sections. Such an arrangement permits smooth and continuous contact between the cam paths and the associated cam roller 1073 and between gear path 1074 and pinion gear 1078'. As is illustrated in FIG. 11, the clearance between the cam rollers 1073 and the cam paths 1075 may be adjusted by means of an eccentric gear 1001 and a motor 1002 adapted to rotate eccentric gear 1001. The shape of eccentric gear 1001 is adapted such that its rotation causes adjustment of the distance between the dies (not illustrated) and the inked surface, while still maintaining adequate engagement of gear 1078', thus allowing the operator to vary the pressure of the ink plates on the molded plastic articles during the printing operation.

Figure 9:
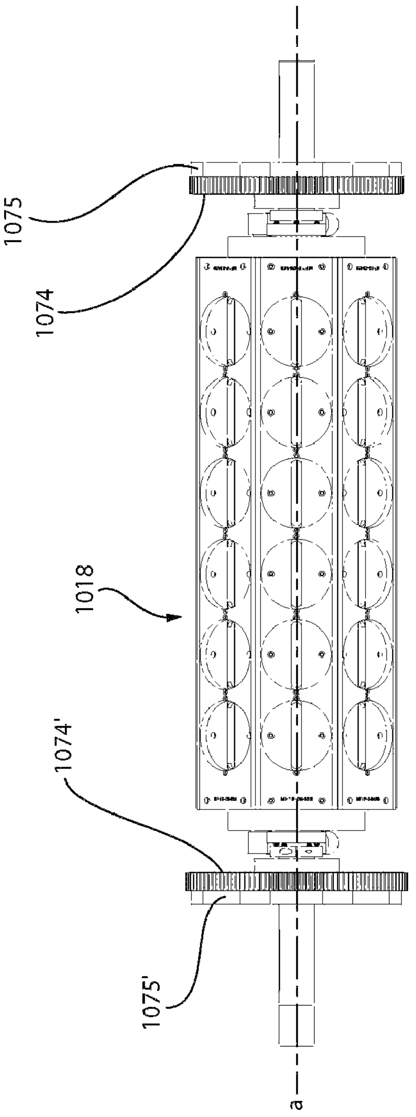
FIG. 9 is a front view of the vacuum thermoforming drum and gear path illustrated in FIG. 8.

As is illustrated in FIG. 9, each side of drum 1018 may conveniently have differently sized first gear path 1074 and second gear path 1074', as well as cam first path 1075 and second cam path 1075'. As will be understood by those of ordinary skill in the art, articles of different height require different amounts of clearance. By allowing for differently sized gear paths and cam paths on either side of drum 1018, apparatus 1000 may be reconfigured more easily between production runs by engaging one of gear paths 1074, 1074' for runs of articles having a first die height, and engaging the other for articles having a second die height.

Figure 12:
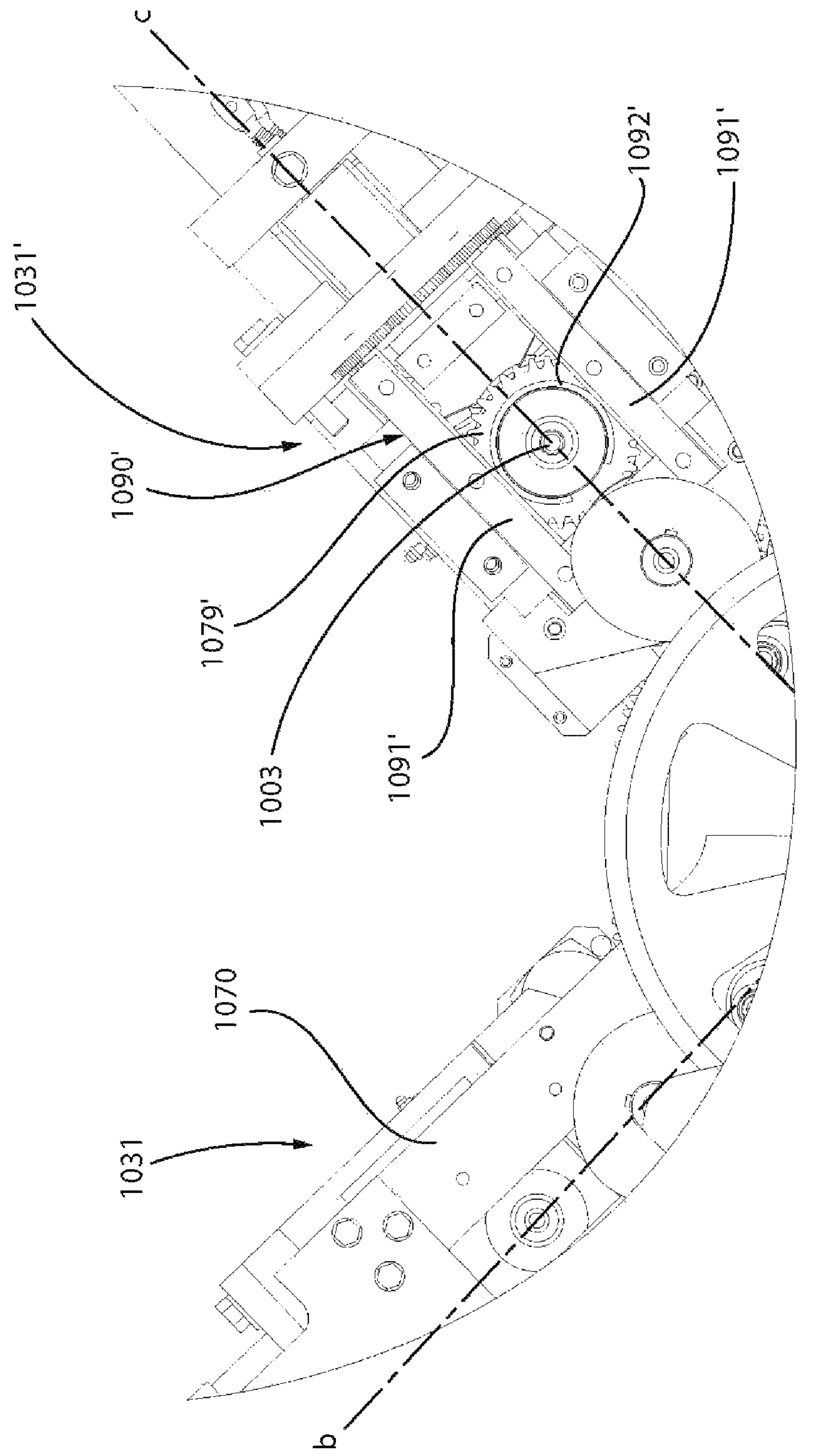
FIG. 12 is a side view of the embodiment illustrated in FIG. 7 with portions of the print frame removed from one print assembly to illustrate the linear bearing utilized in that assembly to allow constrained motion of the print assembly.

As illustrated in FIGS. 7 and 12, print structures 1031 and 1031' are arranged such that each can operate without interfering with the other. Axis a is the central axis about which drum 1018 rotates. Axis b extends from central axis a through the center of print structure frame 1070, and axis c extends from central axis a through the center of print structure 1070'. The motion of print structures 1031, 1031' is preferably constrained to be along axes b and c respectively and normal to central axis a in order to reduce the chance of smearing or smudging when articles are printed. FIG. 12 illustrates a section of print structure 1031' with a portion of print structure frame 1070' removed to illustrate linear bearing assembly 1090'. Linear bearing rails 1091' constrain the movement of inner bearing 1092' such that motion of print structure 1031' can raise and lower along axis c as cam path 1075' is followed. Constraining the motion to be substantially linear is preferred as it reduces the likelihood of smearing as compared to embodiments in which corresponding print structures move up and down along a curved path. As illustrated, where two print structures 1031, 1031' are used, it is preferred that they be arranged such that axes b and c are substantially perpendicular to one another in allow for operation without interference.

Operation

Referring again to FIG. 1, in a typical operation plastic material is forced from the extruder 12 through the die 14 to form the hot web 16, the web being continuously drawn from the extrusion die 14 by clockwise rotation of the drum 18. It will be understood that this drum may rotate in the counter-clockwise direction if desired to extend the web 16 around the bottom of the drum 18 and thereafter to the die cutter 28.

Substantially as soon as the web 16 encounters dies 20 of the drum 18 vacuum is applied and the material of the web 16 is drawn by vacuum over the contours of the dies 20 to form the lids or such other articles as it may be desired in any particular manufacturing operation. Ink 36 is applied by print structure 31. As drum 18 rotates, the web material with the articles now formed therein and printed remains in contact with the drum 18 until separating from the drum surface and being conveyed to the die cutter apparatus 28. Extra material from the web not formed into articles may be recovered and ground and returned to the hot melt extruder 12.

Multi-Color Embodiment

As previously discussed, FIG. 2 represents an embodiment of the apparatus of the present invention capable of printing more than one color. Similar to the embodiment illustrated in FIG. 1, in a typical operation plastic material is forced from the extruder 112 through the die 114 to form the hot web 116, the web being continuously drawn from the extrusion die 114 by clockwise rotation of the drum 118. It will be understood that this drum may rotate in the counter-clockwise direction if desired to extend the web 116 around the bottom of the drum 118 and thereafter to the die cutter 128.

Substantially as soon as the web 116 encounters dies 120 of the drum 118 vacuum is applied and the material of the web 116 is drawn by vacuum over the contours of the dies 120 to form the lids or such other articles as it may be desired in any particular manufacturing operation. First ink color 136 is applied by print structure 131. As drum 118 rotates, second ink color 136" is applied by print structure 131", and third ink color 136' is applied by third print structure 131'. The web material with the articles now formed therein and printed remains in contact with the drum 118 until separating from the drum surface and being conveyed to the die cutter apparatus 128. Extra material from the web not formed into articles may be recovered and ground and returned to the hot melt extruder 112.

In each embodiment, gear paths and cam paths analogous to 1074, 1074' and 1075, 1075' respectively are adapted to raise and lower print structures as required to provide sufficient clearance to allow for the rotation of the vacuum forming drum and ensure properly timed engagement of the printing surface with the articles being printed. It will be understood that while the adjustable cam rollers and gears described above with reference to the illustrative embodiments are preferred at this time, other and equivalent drive devices such as belts, chains and the like may also be used to synchronize the rotation of the various components of the thermoforming and printing system. Alternatively or additionally a speed control and synchronization may be achieved electronically using high resolution encoders and variable speed motors and the like. Key considerations are to avoid slippage between the rotating drum and the inking cylinders as such slip will deregister the plates from the articles being printed and to ensure substantially vertical movement of the printing structures as flat engagement of the printing surfaces acts to reduce the likelihood of smudging.

While the invention has been described with reference to a specific article and a specific apparatus, it is to be understood that it may be carried out using apparatus of different style and design and also that articles other than molded plastic drink cup lids may be manufactured and printed in accordance with the teachings of this patent.

I claim:

1. An apparatus for vacuum thermoforming and printing plastic articles from a substantially continuous web of plastic material, said apparatus comprising:

a. a vacuum thermoforming drum for receiving said substantially continuous web, said drum being rotatable about a central axis and having a plurality of die mounting surfaces arranged circumferentially thereon, at least one said die mounting surface comprising a vacuum thermoforming die defining said articles;

b. said drum further comprising a gear path and a cam path, i. said gear path comprising a plurality of substantially flat geared sections aligned with said die mounting surfaces and a plurality of substantially curved geared sections between said substantially flat geared sections, ii. said cam path comprising a plurality of substantially flat cam path sections aligned with said die mounting surfaces and a plurality of substantially curved cam path sections between said substantially flat cam path sections;

c. a vacuum source operably attached to said drum for drawing said substantially continuous web into contact with said vacuum thermoforming die;

d. a drive for rotating said drum;

e. at least one print structure arranged in a print structure frame and comprising a printing cylinder adjacent said drum for contacting and imparting ink to said articles after said articles are formed, i. said print structure frame comprising a linear bearing adapted to allow said printing cylinder to move in a constrained motion substantially normal to said central axis, ii. said printing cylinder further comprising a print cylinder shaft having a pinion gear adapted to engage said gear path and a cam roller adapted to engage said cam path;

wherein rotation of said drum causes rotation of said gear path and said cam path;

rotation of said gear path causes said pinion gear to rotate said print cylinder in synchronism with the rotation of said drum; and said cam roller and said cam path are adapted to maintain engagement of said pinion gear and said gear path as said drum rotates.

2. The apparatus of claim 1 wherein said drum further comprises a second gear path and a second cam path;

said print cylinder shaft further comprises a second pinion gear adapted to engage said second gear path and a second cam roller arranged to engage said second cam path; and said pinion gear and said cam roller, and said second pinion gear and said second cam roller, are adapted to be selectively engagable;

whereby engaging said pinion gear and said cam roller, and disengaging said second pinion gear and said second cam roller, allows for forming and printing said articles with dies of a first die height; and engaging said second pinion gear and said second cam roller, and disengaging said pinion gear and said cam roller, allows for forming and printing articles with dies of a second die height.

3. The apparatus of claim 1 comprising at least two said print structures, whereby each said print structure is capable of printing using a different color ink, thereby enabling said articles to be printed using multiple colors.

4. The apparatus of claim 3 wherein said print structures are arranged perpendicular to one another.

5. The apparatus of claim 1 further comprising a motor and an eccentric gear wherein said motor is affixed to said print structure frame and adapted to drive said eccentric gear; said eccentric gear is operably connected to said print cylinder such that rotation of said eccentric gear adjusts a distance between said print cylinder and said drum;

whereby operation of said motor allows adjustment of said print cylinder to allow for different die heights and different printing pressures.

6. The apparatus of claim 1 further comprising a die cutter for cutting said articles from said substantially continuous web.

7. The apparatus of claim 1 wherein said substantially continuous web comprises a heated, extruded, thermoformable plastic material, and said vacuum forming drum is adapted to allow cooling of said articles after thermoforming.

8. The apparatus of claim 1 wherein said drum comprises a plurality of gear paths and cam paths;

said print cylinder shaft further comprises a plurality of pinion gears, each said pinion gear adapted to engage one of said plurality of gear paths;

said print cylinder shaft further comprises a plurality of cams, each said cam adapted to engage one of said plurality of cam paths; and said gear paths, cam paths, pinion gears, and cam roller are adapted to be selectively engagable;

whereby engaging one said pinion gear and one said cam roller allows for forming and printing said articles with dies of a predetermined die height.

* * * * *